United States Patent [19]
Zanelli et al.

[11] Patent Number: 5,463,593
[45] Date of Patent: Oct. 31, 1995

[54] APPARATUS FOR QUANTITATIVE MEASUREMENTS OF ULTRASONIC WAVE POWER DISTRIBUTION

[75] Inventors: Claudio I. Zanelli, Sunnyvale; Frank R. Whitehead, Orangevale, both of Calif.

[73] Assignee: Claudio I. Zanelli, Intec Research Company, Sunnyvale, Calif.

[21] Appl. No.: 212,759

[22] Filed: Mar. 14, 1994

[51] Int. Cl.$^6$ ............................................. H04B 17/00
[52] U.S. Cl. ..................................................... 367/13
[58] Field of Search .............................. 367/13; 73/1 DV

[56] References Cited

U.S. PATENT DOCUMENTS 4,081,216  3/1978  Cook ........................................ 73/1 DV

OTHER PUBLICATIONS

Holm et al, "Optical Diffraction Tomography of Ultrasonic Fields with Algebraic Reconstruction Techniques, " *IEEE Ultrasonics Symposium 1990* (1990), pp. 685–688.
Carl W. Hennige, "Schlieren Optical System for Visualizing Ultrasonic Waves, " *Materials Evaluation*, vol. 47 (May, 1989), pp. 496–687.
W. R. Klein and Bill D. Cook, "Unified Approach to Ultrasonic Light Diffraction, " *IEEE Transactions on Sonics and Ultrasonics*, vol. SU–14, No. 3 (July, 1967), pp. 123–134.
P. N. T. Wells, *Physical Principles of Ultrasonic Diagnosis*, Academic Press, 1969, pp. 65–69 and 233–234.
Bill D. Cook et al., "A Numerial Procedure for Calculating the Integrated Acoustooptic Effect, " *IEEE Transactions on Sonics and Ultrasonics*, vol. SU–27, No. 4 (Jul. 1980), pp. 202–207.
Peter D. Edmonds, *Ultrasonics*, vol. 19, Academic Press Inc. (1981), pp. 472–475.
Frederick Kuliasko et al, "Diffraction of Light by Supersonic Waves: The Solltion of the Raman–Nath Equations–I, " *Proc. Indian Acad. Sci. A*, vol. 67 (1968), pp. 295–302.
Michael E. Haran, "Comparison of an Acousto–Optic and a Radiation Force Method of Measuring Ultrasonic Power, " *J. Acoust. Soc. Am.*, vol. 57, No. 6 Part II (Jun. 1975), pp. 1436–1440.
Andrzej Cwik and Helmut Ermert, "A Quantitative Schlieren Method For the Investigation of Axisymmetrical Shock Waves, " *IEEE Ultrasonics Symposium Proceedings* (1993), pp. 789–792.
Gordon S. Kino, *Acoustic Waves: Devices, Imaging, and Analog Signal Processing*, Prentice—Hall, Inc., pp. 509–511, 536.
Dale Ensminger, *Ultrasonics, Fundamentals, Technology, Applications*, Second Ed., Revised and Expanded, Marcell Dekker, Inc., pp. 368–370, 388.
Rainer Reibold and Walter Molkenstruck, "Optical Measuring Techniques, " *Ultrasonic Exposimetry*, CRC Press (1993), pp. 143–162.

*Primary Examiner*—Daniel L. Pihulic
*Attorney, Agent, or Firm*—Skjerven, Morrill, MacPherson Franklin & Friel; Forrest E. Gunnison; David T. Millers

[57] ABSTRACT

A schlieren imaging system provides quantitative images suitable for testing medical equipment. One embodiment includes precision optics which form an image of a volume of a medium through which an ultrasonic acoustic wave propagates. A spatial filter passes diffracted light but blocks other light. A camera forms an image of the medium from the diffracted light so that regions of the medium which diffract light have higher light intensity in the image. From image intensities, a processor determines acoustic pressures or intensities, typically as a value indicating an integral of the acoustic pressure or intensity along an optical path through the volume. Integrated pressure is determined from a look-up table which relates predicted light intensity to pressure values which cause the predicted light intensity. The system is calibrated by forming an image of a reference ultrasonic acoustic wave and determining a relation between the image intensities and predicted intensities. The system may include a timing circuit which periodically activates and deactivates a transducer and causes emission of synchronized pulses of light. The pulses of light are synchronized with a selected delay after activations of the transducer, so that an image is formed which shows an ultrasonic acoustic wave that has evolved during the delay.

30 Claims, 4 Drawing Sheets

APPARATUS FOR QUANTITATIVE MEASUREMENTS OF ULTRASONIC WAVE POWER DISTRIBUTION

REFERENCE TO MICROFICHE APPENDIX

The present specification comprises a microfiche appendix A. The total number of microfiche sheets in the microfiche appendix is one. The total number of frames in the microfiche appendix is fifteen.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates generally to quantitatively measuring the power distribution of an ultrasonic acoustic wave in a medium, and in particular to using schlieren imaging for quantitatively measuring the acoustic pressure, intensity, or power distribution of an ultrasonic wave in a medium.

2. Description Of Related Art

Ultrasonic acoustic waves have many medical applications. For example, ultrasonic waves are commonly used to scan tissue and can be focused to destroy tumors. Accordingly, many types of medical equipment contain transducers which convert electrical energy into ultrasonic acoustic energy. For safety and efficiency, this medical equipment is regularly tested to determine the distribution of power in the ultrasonic waves. The tests must be sufficiently accurate and quantitative to indicate whether the equipment meets design specifications and legal requirements.

Prior art testing of medical ultrasound equipment commonly employs a probe which detects acoustic pressure caused by an ultrasonic acoustic wave propagating through a fluid. The probe is used to measure the acoustic pressure at a series of points in the fluid. The series of measurements indicates the acoustic pressure distribution from which power in the ultrasonic wave can be determined. This prior art testing has several drawbacks. One drawback is that a complete measurement of the power distribution of an ultrasonic wave requires many measurements and consequently a considerable amount of time. Another drawback is that the probe can interfere with the ultrasonic wave being measured and cause the measurements to be inaccurate.

Figure 1:
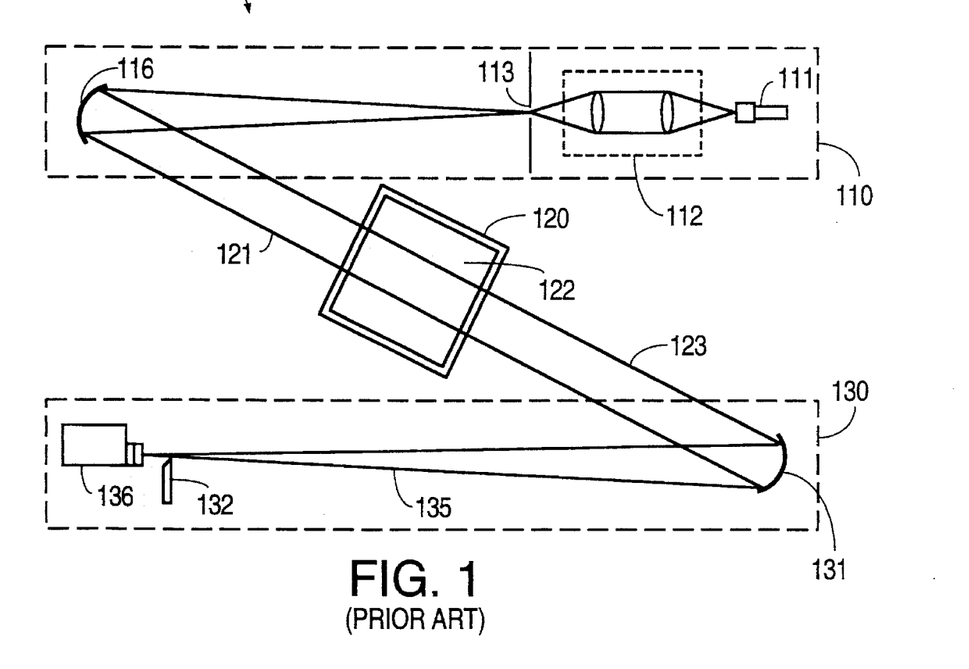
FIG. 1 shows a prior art schlieren system.

Schlieren imaging has been used to qualitatively observe the propagation of ultrasonic acoustic waves through a transparent medium by observing the light diffracted from variations caused in the medium by acoustic pressure. A conventional schlieren system 100 is shown in FIG. 1 and includes a source 110 of parallel light 121 of wavelength $\lambda$, an immersion tank 120 which contains a transparent medium 122, and an optical system 130. When an ultrasonic acoustic wave having wavelength $\Lambda$ propagates through medium 122, the ultrasonic acoustic wave causes a pattern of localized changes in pressure (which in turn causes a pattern of localized changes in the refractive index of medium 122). Light 121 from light source 110 is diffracted by the pattern of localized changes in the refractive index as light 121 passes through transparent medium 122.

Diffracted light 123 exits medium 122 at discrete angles $\Theta_m$ relative to the direction of incident light 121. The discrete angles $\Theta_m$ are approximately $m(\lambda/\Lambda)$, wherein m is an integer indicating the order of the diffracted light. Optical system 130 focuses diffracted light 123 using a spherical focusing mirror 131. A knife edge 132, that is positioned in a light beam 135 from spherical focusing mirror 131, blocks the zero-th order light, but portions of the first and higher orders of diffracted light are focused into an image of the regions in medium 122 which diffracted the light. The image therefore qualitatively shows the pattern of the ultrasonic acoustic wave.

Although prior art schlieren systems such as that shown in FIG. 1 provide qualitative images of ultrasonic acoustic waves, prior art schlieren systems have not provided measurements which are suitable for testing of medical equipment. The images formed are blurred, do not contain a precisely controlled fraction of the diffracted light, and contain too much background light (noise) to quantitatively measure diffracted light intensities from precisely defined regions of medium 122. Further, such prior art images do not give a usable quantitative measure of the variations in the refractive index, pressure, or power in the ultrasonic acoustic wave because the refractive index, pressure, and power are not linearly related to the measured diffracted light intensity. Accordingly, the prior art schlieren systems can not be used for testing the efficiency and safety of medical equipment such as ultrasound scanners.

SUMMARY OF THE INVENTION

In accordance with the present invention, a schlieren imaging system provides quantitative images which indicate quantitative power distributions suitable for testing of medical equipment. One embodiment in accordance with the invention includes precision optics that form an image of an observation volume in a medium through which an ultrasonic acoustic wave propagates. Typically, the observation volume is large enough to contain the regions of the ultrasonic acoustic wave which are of interest when testing medical equipment. Light passes through the observation volume and is diffracted by variations in the refractive index of the medium caused by the ultrasonic acoustic wave. A spatial filter in the optics passes a predetermined fraction of the diffracted light, typically the diffracted light from a first order up to a predetermined maximum order. The spatial filter also blocks zero-th order light. A camera forms an image of the medium using the diffracted light passed by the spatial filter so that regions of the medium which diffract more light are brighter in the image. The precision optics and the well controlled spatial filtering yields light intensities in the image that can be used as a quantitative measure of the predetermined fraction of the light diffracted from corresponding regions in the medium. A quantitative analyzer connected to the camera determines acoustic intensity, pressure, or power from the light intensities in the image.

Another embodiment in accordance with the present invention includes: (i) an immersion tank enclosing an observation volume; (ii) a light source which generates a substantially parallel beam of light that passes through the observation volume along a first axis; (iii) a spatial filter which blocks the undiffracted portion of the light emerging from the observation volume along the first axis; (iv) a camera which forms an image of the observation volume using diffracted light transmitted by the spatial filter; and (v) a quantitative analyzer which processes the image to provide a quantitative measure of acoustic pressures and/or power in the observation volume.

Typically, an optical system is positioned between the observation volume and the spatial filter. The optical system focuses light from the observation volume to spatially separate the diffracted light from zero-th order light, i.e., the undiffracted light, and the spatial filter blocks a selected portion of light from the focused light provided by the optical system.

Typically, the quantitative analyzer executes a process which generates an integral of the acoustic intensity along an optical path through the observation volume, i.e, a measure of the acoustic intensity. The quantitative analyzer may also execute a process which generates an integral of the pressure change along an optical path through the observation volume, i.e, a measure of the acoustic pressure. The pressure integral is determined from a look-up table which relates predicted light intensities to pressure integrals which cause the predicted light intensities.

Optionally, the schlieren imaging system may further include a timing circuit. The timing circuit periodically activates and deactivates an ultrasonic transducer and causes the source of parallel light to emit a pulse of light which follows activation of the transducer by a predetermined delay. A user of the schlieren imaging system selects the delay between activation of the transducer and the following emission of the light pulse. The user also selects a time interval that the transducer is active. Because the pulses of light are synchronized with a delay after activations of the transducer, an image is formed that shows a pattern generated by an ultrasonic acoustic wave that has evolved for the selected delay. Accordingly, the camera captures a still image (or stroboscopic image) showing the pattern of an ultrasonic acoustic wave at selected times in its evolution. The still image may be used to determine the acoustic energy in a section of the ultrasonic wave.

One method in accordance with the present invention includes the steps of generating light that travels through a medium, generating an ultrasonic acoustic wave which propagates through the medium, forming an image of the medium using light diffracted by the ultrasonic acoustic wave, measuring a light intensity for a region of the image, and generating any one of an acoustic intensity, an acoustic pressure, and an acoustic power corresponding to the measured light intensity.

The method may include an initial calibration which measures a light intensity for the zero-th order light and determines from the light intensity a calibration constant for the schlieren imaging system. Alternatively, calibration can be performed by generating a reference ultrasonic acoustic wave which has a known power, forming an image of the medium using light diffracted by the reference ultrasonic acoustic wave, measuring light intensities for a region of the image, and determining a calibration constant which relates the measured light intensities to the known power of the reference ultrasonic acoustic wave.

The calibration constant is used when measuring acoustic intensity, pressure, or power for measured ultrasonic acoustic waves. Typically, when determining integrated acoustic pressure, measured light intensities are normalized according to a calibration constant, and the normalized intensities are matched with predicted light intensities in a look-up table. An integrated pressure is determined from the predicted light intensities matched.

BRIEF DESCRIPTION OF THE DRAWINGS

Similar or identical items in different figures have the same reference symbols.

DETAILED DESCRIPTION OF THE PREFERRED EMBODIMENTS

Figure 2:
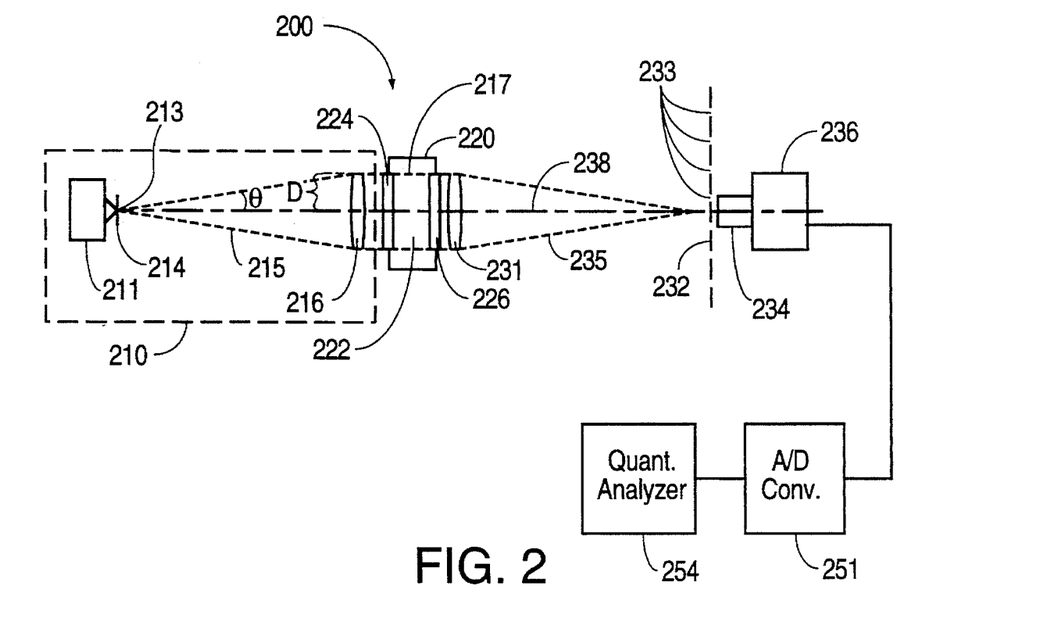
FIG. 2 shows an embodiment of a quantitative schlieren imaging system in accordance with the present invention.

FIG. 2 is a diagram of a quantitative schlieren imaging system 200 in accordance with an embodiment of the present invention. Schlieren imaging system 200 generates quantitative images indicating quantitative acoustic intensity, pressure, and power distributions of ultrasonic acoustic waves and is suitable for testing of medical equipment. In operation, a transducer, which generates an ultrasonic acoustic wave, is placed in a medium 222. A light source 210 generates parallel light 217 which passes through an observation volume in medium 222. The observation volume is typically large enough to contain most regions of the ultrasonic acoustic wave which are of interest when testing medical equipment and has a cross-sectional area that is typically between about 5 cm and about 25 cm in diameter.

Light 217 passes through the observation volume and is diffracted by variations in the refractive index of the medium caused by the ultrasonic acoustic wave. A spatial filter 232 passes a predetermined fraction of a diffracted light beam 235, typically the diffracted light from first order up to a predetermined maximum order. Spatial filter 232 also blocks the zero-th order light. A lens 234 forms an image of medium 222 using the portion of diffracted light 235 passed by spatial filter 232. In the image, regions of medium 222 that diffract more light are brighter in comparison to regions of medium 222 that diffract little or no light. Precision optics and novel spatial filtering yields light intensities in the image that quantitatively indicate the fraction of light 235 diffracted from corresponding regions in medium 222. A quantitative analyzer 254 coupled to an optical sensor 236 determines acoustic intensity, pressure, and/or power from the light intensities measured by optical sensor 236.

System 200 is mounted on a conventional optical support structure (not shown). Such support structures are well known in the art and typically include a sealed case to prevent dust from entering the optics and optical mounts which minimize vibration and maximize thermal stability.

In this embodiment, parallel light source 210 includes an approximate point light source 211. Point source 211 may include for example a laser, a laser diode, a lamp, or a xenon flash lamp typically having a power output in the range from about 1 to 300 watts. Point source 211 may also include a driver operable in a pulsed mode to permit measurement of time dependent effects as disclosed below.

Point source 211 approximates a point source of light, but for all known light sources, light appears to originate from a finite area rather than from an infinitesimal point. Accordingly, point source 211 has an effective size which indicates a dimension of the finite area from which light appears to originate. For example, a typical laser diode is about 12 μm by 100 μm and has an effective size of about 100 μm. A laser beam directed along the optical axis of a lens acts as a point source having effective size about equal to the diameter of the laser beam. Larger light sources such as lamps may be used with condensing lenses which focus light into a fiber optic cable so that the effective size of the light source is the diameter of the fiber optic cable. The effective size of point source 211 can also be reduced using a pin hole aperture. Smaller pin holes apertures better approximate point light sources, but also reduce the light available for imaging. As disclosed below, the effective size of point source 211 is selected to match the optical properties of the remainder of quantitative schlieren imaging system 200.

Point source 211 generates a light cone 215 having an average wavelength $\lambda$. An optical filter 214 controls the wavelength bandwidth of point source 211. Optical filters for controlling wavelengths are well known in the art and include for an example an OG570 optical filter which is a high pass filter commercially available from Melles Griot of Irvine, Calif. Optical filter 214 may be omitted if point source 211 provides light with a suitable bandwidth. Narrow bandwidths reduce chromatic aberration in quantitative schlieren system 200 and enable the sharp focusing necessary to provide a quantitative measure of diffracted light intensities. A bandwidth of less that about 200 nm (full width at half maximum) is desired for light source 210, but limiting the bandwidth too much may not provide sufficient light for imaging.

Point source 211 is positioned within quantitative schlieren imaging system 200 at a focal point 213 of a collimating lens 216 so that light beam 217 exiting lens 216 is a substantially parallel light. Light beam 217 varies from being exactly parallel because of the effective size of point source 211 and the quality of lens 216. As disclosed below, the effective size of point source 211, the quality of lens 216, and therefore the extent to which light beam 217 is parallel are matched according to the required performance of quantitative schlieren imaging system 200.

Light beam 217 enters an immersion tank 220 of quantitative schlieren imaging system 200 through a first optical window 224, traverses the observation volume of medium 222 contained in immersion tank 220, and exits through a second optical window 226. Optical windows 224 and 226 must be of sufficient quality that quantitative schlieren system 200 is capable of precisely focusing diffracted light and separating first and higher order diffracted light from zero-th order light. Accordingly, the surface of optical windows 224 and 226 are flat and smooth having surface variations which are less than about $\lambda/2$, and preferably less than $\lambda/10$.

Typically, when testing a medical ultrasonic transducer, medium 222 is water. As is well known, body tissues are mainly water so that the wavelength and evolution of an ultrasonic wave in water is similar to the wavelength and evolution in a human body. Alternatively, other mediums may be employed in immersion tank 220. Typically, medium 222 is a liquid that is passed through a particulate filtering system (not shown) to remove particulates larger than about 5 μm that may be introduced into medium 222, for example when a transducer is placed in immersion tank 220 for testing.

Diameter D of lens 216 and the angular size of light cone 215 from point source 211 control the cross-sectional area of light beam 217 emerging from lens 216 and consequently, the cross-sectional area of the observation volume of medium 222 through which light beam 217 passes. For testing medical devices, diameter D of lens 216 is typically in the range between about 5 cm and about 25 cm. If desired, an aperture stop (not shown) in light source 210 can be adjusted to reduce the size of light cone 215 illuminating lens 216 and thereby reduce the cross-sectional area of parallel light beam 217 and the observation volume.

The diameter of the observation volume is typically about equal to the penetration depth of an ultrasound beam in medical use. This allows the observation volume to contain most or all regions of an ultrasonic acoustic wave that are of interest so that the regions of interest can all be imaged simultaneously. However, if some regions of interest in an ultrasonic acoustic wave are outside the observation volume, the transducer producing the ultrasonic acoustic wave may be moved relative to the observation volume so that the regions not originally in the observation volume can be observed in a subsequent measurement.

Light which is diffracted by an ultrasonic acoustic wave in medium 222 exits the medium at angles relative to an optical axis 238 (also sometimes referred to herein as the x-axis). Different wavelengths are diffracted at different angles. Accordingly, the diffraction causes chromatic aberrations which blur images formed from diffracted light. The diffracted light is also subject to refraction at the surfaces of optical window 226 which causes further chromatic separation. Accordingly, to achieve the strict focusing requirements of quantitative schlieren imaging system 200, the bandwidth of light used should be limited as disclosed above.

A converging lens 231 focuses light which exits immersion tank 220 through optical window 226. Lens 231 is similar in size to lens 216. As disclosed below, lenses 216 and 231 are typically identical, and each of lenses 216 and 231 has an aperture which is optimal for the required resolving power of quantitative schlieren imaging system 200. Spatial filter 232 is positioned to selectively block light transmission from lens 231 to lens 234 and optical sensor 236. Spatial filter 232 is in the focal plane of lens 231. Light passing straight through immersion tank 220 without being diffracted, i.e., zero-th order light, is focused by lens 231 onto an opaque region of spatial filter 232, and is blocked.

When an ultrasonic acoustic wave is measured, parallel light beam 217 enters medium 222 along optical axis 238, and the ultrasonic acoustic wave propagates through medium 222 along a z-axis perpendicular to optical axis 238. A portion of light beam 217 is diffracted by variations in the refractive index of medium 222 caused by the ultrasonic acoustic wave. Lens 231 focuses the diffracted light into regions centered at angles of $m(\lambda/\Lambda)$ radians relative to optical axis 238 and the center of lens 231, where m indicates the order of the diffracted light, $\lambda$ is the wavelength of the light, and $\Lambda$ is the wavelength of the ultrasonic wave in medium 222. In one embodiment, spatial filter 232 has a single circular opaque region centered on optical axis 238 and is transparent elsewhere. The circular opaque region has a diameter sufficient to block the zero-th order but not large enough to block any of the first or higher order diffracted light.

Alternatively, spatial filter 232 may have openings or transparent regions 233 which permit light at the desired angles $m(\lambda/\Lambda)$ to reach lens 234 and optical sensor 236 and opaque annular regions which block light at other angles. The opaque annular regions block light scattered by particulates in medium 222. The scattered light causes bright spots in an image of a measured ultrasonic wave and error or noise in the determination of the diffracted light intensities. However, a spatial filter with opaque annular rings is selective to light diffracted by an ultrasonic acoustic wave having a predetermined wavelength $\Lambda$, and must be replaced if an ultrasonic acoustic wave having a different wavelength or a distribution of wavelengths is measured.

The light passed by spatial filter 232 is focused by lens 234. Lens 234 typically has a diameter of about 10 to about 80 mm and a focal length of about 50 to about 500 mm. The focal length of lens 234 is selected to form an image of a portion of the observation volume in medium 222. A zoom lens with variable focal length may be employed so that the imaged portion of the observation volume can be varied.

Not all of the light diffracted in the observation volume of medium 222 is focused by lens 234. The highest orders of the diffracted light are at angles too large to be received by lens 234. Accordingly, there is a highest order m-max of the diffracted light that is focused by lens 234. Highest order m-max of the diffracted light is 16 in a typical embodiment wherein lens 231 has a 2 m focal length, lens 234 has a diameter of 32 mm, the light wavelength λ is about 0.6 μm, and the acoustic wavelength Λ is about 0.3 mm.

Optical sensor 236 measures intensities of the light focused by lens 234, typically measuring light intensities at an array of points in a plane where lens 234 forms the image of medium 222. Optical sensor 236 may be a video camera, a photographic camera, or any device capable of measuring or recording light intensities. The light intensities of the image measured by optical sensor 236 quantitatively indicate a precisely controlled fraction of the diffracted light.

In quantitative schlieren imaging system 200, optical sensor 236 is a video camera and commonly available from a variety of sources. Optical sensor 236 transmits to an analog-to-digital converter 251, an analog video signal representing the image formed by the light passing through spatial filter 232 and lens 234. Analog-to-digital converter 251 digitizes the video signal and creates an array of light intensities for storage or processing by a quantitative analyzer 254.

The digitized array of light intensities provides a two-dimensional profile of a three dimensional pattern caused by a three dimensional ultrasonic acoustic wave. Each light intensity is related to an integral of acoustic pressure and an integral of acoustic intensity along a different optical path through the three dimensional pattern. Quantitative analyzer 254 processes the light intensities to determine pressure and/or intensity integrals for the ultrasonic acoustic wave in-medium 222.

The acoustic power and the integrated acoustic intensities can be determined using the approximate proportionality between the measured light intensities and the integrals of the acoustic intensity along the direction of optical axis 238. The measured light intensities are $$L = K * \int I \, dx \quad \text{(eq. 1)},$$

where L is light intensity, I is acoustic intensity, K is a constant, and dx indicates integration along the along the optical path of the light through medium 222 (approximately along the direction of optical axis 238). Total acoustic power P of the ultrasonic acoustic wave is the integral of the acoustic intensity I over the area of a wave front of the ultrasonic acoustic wave. Total acoustic power P is $$P = \int \int I \, dx \, dy = K * \int L \, dy \quad \text{(eq. 2)}$$

where dy indicates integration along a direction perpendicular to optical axis 238 and perpendicular to the direction of propagation of the ultrasonic acoustic wave.

Constant K is related to total acoustic power P and light intensity L as $$K = P/(\int L \, dy) \quad \text{(eq. 3)}$$

and can be determined by calibrating quantitative schlieren system 200 as follows. First, the acoustic power P generated by a reference transducer in response to a specific input voltage is measured using well known techniques such as measurement with a radiation force balance. Second, the reference transducer is used to generate a reference ultrasonic acoustic wave in quantitative schlieren imaging system 200, and light intensities for the reference ultrasonic acoustic wave are measured. Third, measured light intensities L for the ultrasonic acoustic wave are numerically integrated along a line perpendicular to direction of propagation of the ultrasonic acoustic wave. Since total acoustic power P is constant, any line perpendicular to direction of propagation of the ultrasonic acoustic wave can be used. Fourth, the measured power P is divided by the integrated light intensities L to determine constant K. Calibration of quantitative schlieren system 200 can be performed during manufacture, and periodically thereafter to test performance.

Once constant K is determined, integrated acoustic intensities I for an ultrasonic acoustic wave are generated by multiplying measured light intensities L by constant K. It is believed that constant K depends on the temperature of medium 222. However, temperature variations of constant K are less than 1% for typical medical testing when medium 222 is water near room temperature. Using the above process, an image of the observation volume gives a quantitative profile of integrated acoustic intensities at accuracies suitable for testing of medical ultrasound equipment.

Example scripts for processing the measured light intensity values are provided in microfiche Appendix A, which is a part of this disclosure and which is incorporated herein by reference. The scripts are written for MATLAB software which is commercially available from The Math Works, Inc., of Natick, Mass.

Integrated acoustic pressures can also be determined from measured light intensities L. Assuming that lens 234 focuses all of the diffracted light from first order up to order m-max, a predicted light intensity L of diffracted light at a point (or in a pixel) in the image formed by lens 234 and camera 236 is approximately $$L = K' * \left( \sum_{n=1}^{m-\max} J_n(v) \right)^2 \quad \text{(eq. 4)}$$

where $J_n(v)$ is an n-th order Bessel function of the first kind having argument v, and K' is a constant which depends on the intensity of the light from light source 210, the amount of light absorbed in quantitative schlieren imaging system 200, and the sensitivity of optical sensor 236. The argument v of Bessel function $J_n$ is $$v = (2\pi/\Lambda) \int \Delta n(x) * dx \quad \text{(eq. 5)}$$

where $\Delta n(x)$ is the change in the refractive index of medium 222 and is integrated along the path of the light through medium 222. Acoustic pressure p(x) caused by an ultrasonic acoustic wave is related to the change in refractive index $\Delta n(x)$ by $$\Delta n(x) = (dn/dp) \, p(x) \quad \text{(eq. 6)}$$

where (dn/dp) is an adiabatic piezo-optic coefficient for medium 222. The adiabatic piezo-optic coefficient can be experimentally determined for a particular medium, and is well known for water.

To predict light intensities L from eq. 4, quantitative schlieren imaging system 200 is calibrated to determine constant K'. Calibration can be performed by a single point measurement of the zero-th order light received by optical sensor 236. This is typically done by removing spatial filter 232 and measuring a light intensity with optical sensor 236. The measured light intensity is constant K'. Instead of a single constant K' several constants K' corresponding to different points measured by optical sensor 236 could be measured. The several constants K' can be combined to form an average constant K'. Alternatively, the several constants K' can be used to correct for non-linear responses in quantitative schlieren imaging system 200 such as differences in light sensitivity across an image plane measured by optical sensor 236.

Constant K' can also be determined by calibrating quantitative schlieren imaging system 200 using reference transducers which generate reference ultrasonic acoustic waves having known power distributions. For example, light intensities for one or more of the reference ultrasonic acoustic wave are measured, and the measured light intensities are compared to corresponding light intensities predicted using the known power distributions and equations 4, 5, and 6 with constant K' set to one. The ratio of each of the measured light intensities to the corresponding predicted light intensity is constant K'.

In this embodiment, a look-up table relates integrated acoustic pressure as given by the combination of equations 5 and 6 to predicted light intensities calculated from eq. 4 with constant K' set to one. The look-up table can be generated by selecting a range and distribution for a set of integrated pressures. The range selected for the integrated pressures will depend on the size of the observation volume and on the total expected power of the ultrasonic acoustic wave to be measured.

Each integrated pressure in the selected set is stored in memory and plugged into eq. 4 to determine a corresponding predicted light intensity. The predicted light intensities may be determined with constant K' set to a fixed value such as one and then stored in non-volatile memory such as a read-only memory (ROM) or a disc drive. Alternatively, the predicted light intensities could be determined after calibration using a measured constant K'. The predicted light intensities are stored in memory in such a way that corresponding integrated pressures are easily identified.

To use the look-up table, a measured light intensity is normalized, for example by dividing by constant K' determined during calibration. The normalized light intensity is matched with a predicted light intensity from the look-up table, and an integrated pressure corresponding to the predicted light intensity is determined. Well known interpolation techniques may be employed when the normalized light intensity is between predicated light intensities in the look-up table. The temperature of medium 222 can be accounted for by providing a look-up table each of the possible temperatures of medium 222 (different adiabatic piezo-optic coefficients). Interpolation between tables may be used for temperatures that differ from the temperatures used to generate the look-up tables.

As will be apparent to those skilled in the art, the technique disclosed for inverting equations 4, 5, and 6 is subject to many variations. For example, the predicted light intensity may be calculated with constant K' set to any fixed value, and the measured light intensities normalized in accordance with the constant chosen. Alternatively, the predicted light intensities in the look-up table can be changed according to the constants K' determined during calibration, so that the measured light intensities without being changed are properly normalized for use with the look-up table. Additionally, temperature dependence can be accounted for using a single look-up table and normalizing either the predicted light intensities or the measured light intensities according to a function describing temperature dependence. Other variations are possible.

A quantitative measurement of a profile of the integrated acoustic pressure or integrated acoustic intensity of an ultrasonic acoustic wave is determined in the processing time of quantitative analyzer 254. A typical micro-computer such as an IBM PC or compatible with a 50 MHz 80486 microprocessor and 12 Megabytes of random access memory has sufficient processing power to determine acoustic intensity and pressures from measured diffracted light intensities. For an embodiment in which A/D converter 251 generates a 512-by-512 array of measured light intensities, the processing time to convert every measured light intensity to an integrated acoustic pressure or intensity is typically about 50 ms.

Often two-dimensional profiles giving the integrated acoustic intensities or pressures are desired when measuring an ultrasonic acoustic wave. When acoustic pressures or intensities for a three-dimensional distribution of points is desired, several profiles of the ultrasonic acoustic wave can be taken from different perspectives, and the different profiles can be analyzed using computer tomography (CT) techniques. The different profiles can be obtained by rotating a transducer about the direction of propagation of the acoustic wave. CT techniques used to determine a three dimensional distribution of acoustic pressure approximate the integrated pressures as sums of discrete pressures, each discrete pressure being the pressure for a discrete volume of medium 222. Each perspective gives a profile which indicates a different sum of the discrete pressures. Linear equations found by setting the sums equal to the integrated pressure are solved to determine the discrete pressures. A three dimensional distribution of acoustic power can be determined in a similar fashion.

Figure 3:
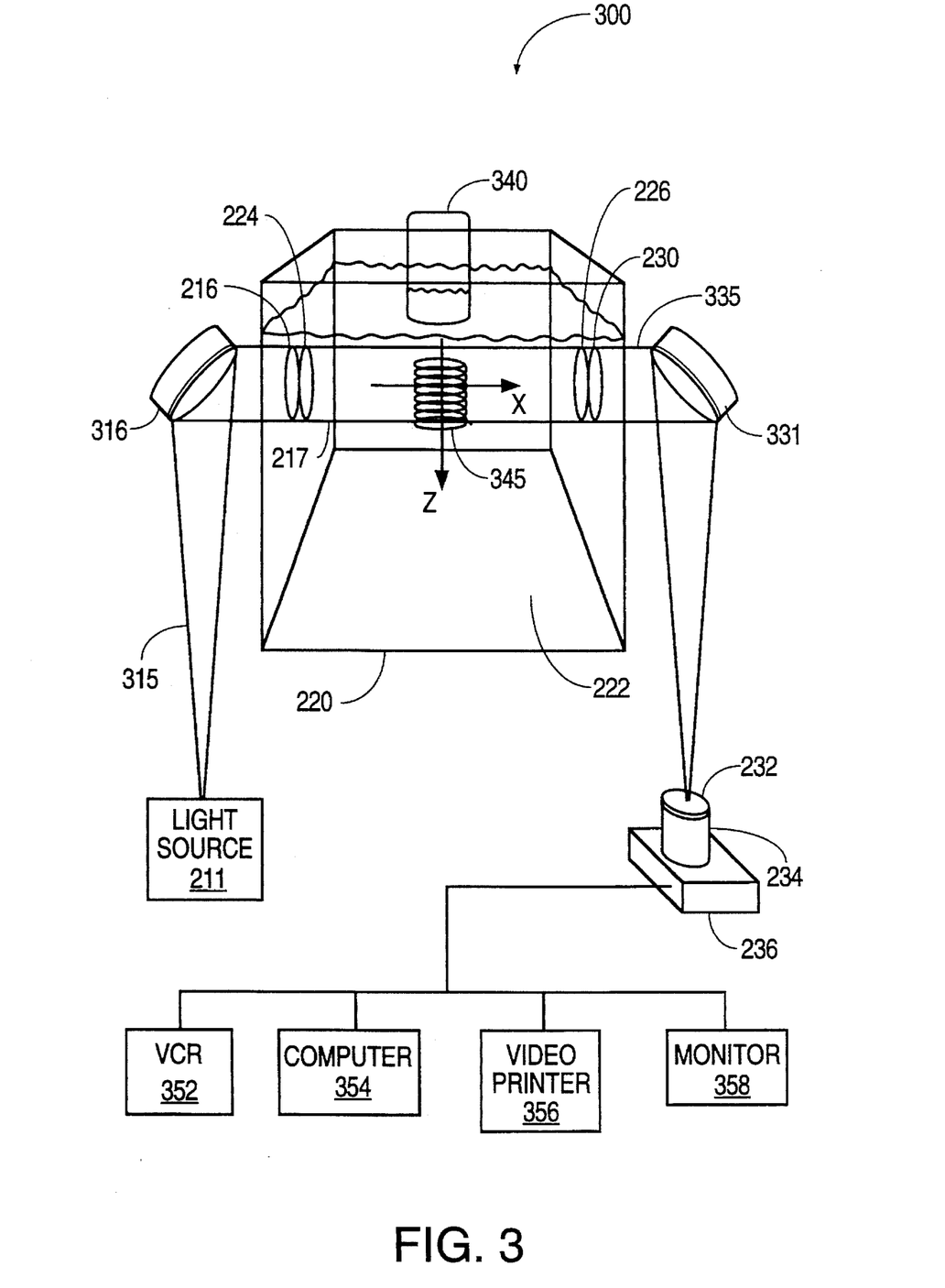
FIG. 3 shows another embodiment of a quantitative schlieren imaging system in accordance with the present invention.

Another embodiment of a quantitative schlieren imaging system 300 in accordance with the present invention is shown in FIG. 3. Quantitative schlieren imaging system 300 is more compact than quantitative schlieren imaging system 200 (FIG. 2) because in system 300 flat mirrors 316 and 331 change the optical path of incident light beam 315 and diffracted light beam 335 respectively. System 200 must have width (along the optical axis 238) at least as long as the sum of the focal lengths of lenses 216 and 231. System 300 has a width (along an x-axis) that is smaller than that of system 200 and height (along a z-axis) that is about equal to the focal length of one of lens 216 and 231 and therefore also smaller than the width of system 200. The more compact size makes system 300 more easily portable and is desirable in an environment such as a hospital where a single quantitative schlieren imaging system may be used to test several medical devices at various locations in the hospital.

In quantitative schlieren system 300, a parallel light beam 217 propagates through medium 222 along the x-axis, and an ultrasonic acoustic wave 345 generated by a transducer 340 propagates perpendicular to the x-axis and along the z-axis. An observation volume in medium 222 is a cylinder which extends from optical window 224 to 226. However, the actual volume observed is limited to the volume through which the ultrasonic acoustic wave 345 propagates and may be further limited by depth of focus of lens 234.

Quantitative schlieren imaging system 300 illustrates use of mirrors 316 and 331 to provide an alternative optical path. Many other alternatives are contemplated. For example, focusing mirrors may be employed in combination with or in place of lenses 216 and 231.

Quantitative schlieren imaging system 300 illustrates that optical sensor 236 may be connected to a variety of devices including a video monitor 358 which displays an image of ultrasonic acoustic wave 345, a video printer 356 which captures and prints a video frame of the image provided by optical sensor 236, a quantitative analyzer 354 which records and processes the image signals from optical sensor 236, and a video cassette recorder (VCR) 352 which records the image from optical sensor 236.

Quantitative analyzer 354 may be used to alter measured light intensities for display on video monitor 358. For example, quantitative analyzer 354 can change the measured light intensity values to values proportional to the integrated acoustic pressure. Differences between measured light intensities can be computer enhanced to improve contrast, or false color indicating ranges of light intensity can be added. Image signals from optical sensor 236 may be further stored, processed, or manipulated as desired.

The principles of operations of quantitative schlieren imaging system 300 are otherwise the same as those of system 200, the description of which is incorporated by reference.

Figure 4A:
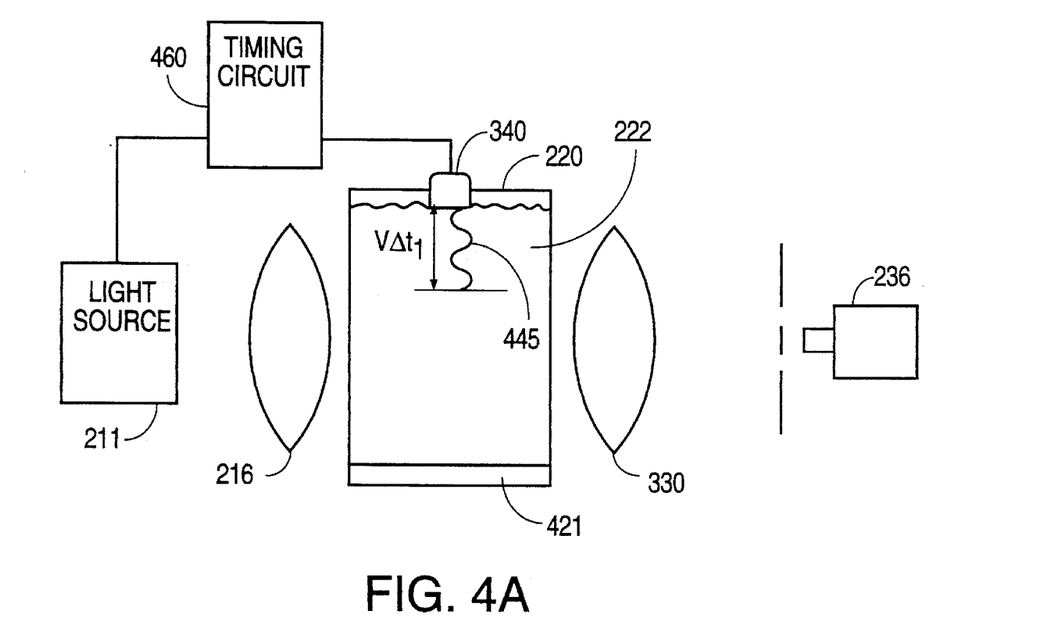
FIG. 4A and 4B illustrate pulse mode operation of a quantitative schlieren imaging system in accordance with the present invention.
Figure 4B:
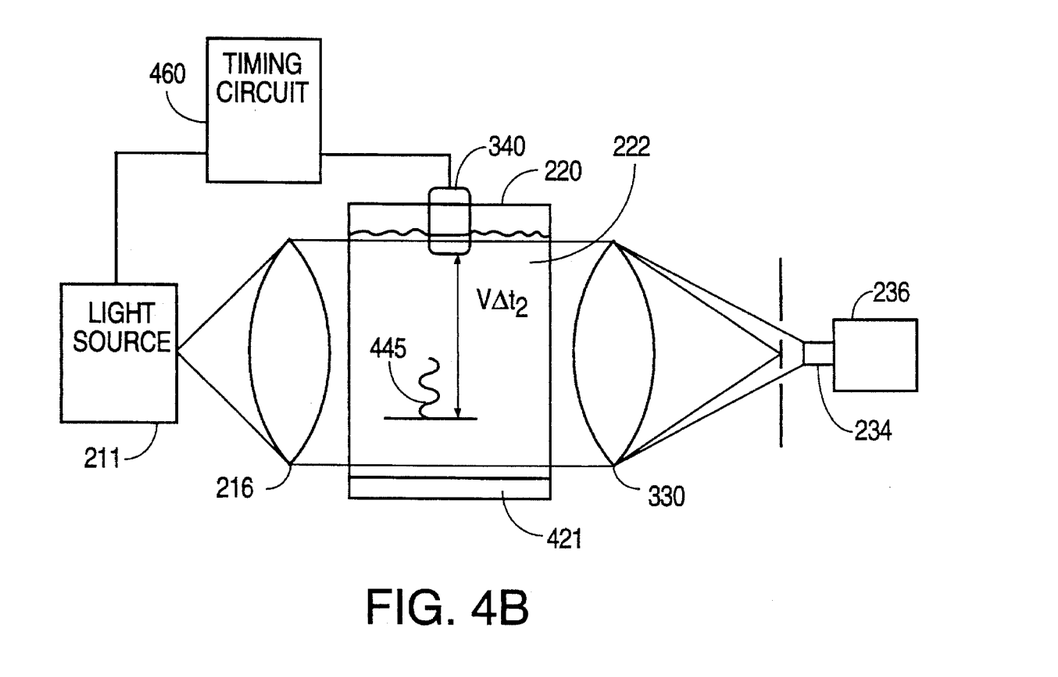

FIGS. 4A and 4B illustrate a configuration of an embodiment of the present invention that includes a pulsed mode of light source 210 that is used to quantitatively measure time dependent characteristics of an ultrasonic acoustic wave 445. Transducer 340 and light source 210 are coupled to a timing circuit 460. Timing circuit 460 controls activation and deactivation of transducer 340 and causes light source 210 to periodically emit a light pulse which is synchronized with a user selected delay time $\Delta t2$ relative to activation of transducer 340.

Ultrasonic acoustic wave 445 is generated when transducer 340 is active for a time interval $\Delta t1$. During the time interval $\Delta t1$, a wave front of ultrasonic acoustic wave 445 propagates a distance $v\Delta t1$, where v is the velocity of wave 445 in medium 222. Transducer 340 is then deactivated, and ultrasonic acoustic wave 445 continues to propagate. During delay time $\Delta t2$, ultrasonic acoustic wave 445 travels a total distance $v\Delta t2$ and may spread out, become more focused, or otherwise evolve according to the characteristics of transducer 340.

At the end of delay time $\Delta t2$, timing circuit 460 causes light source 210 to emit a short pulse of light as shown in FIG. 4B. A typical pulse of light is a 50 watt burst of light for duration less than about 0.1 µs from a light source such as a laser diode. During the short pulse of light, the motion of ultrasonic acoustic wave 445 is relatively insignificant so that lens 234 forms a still image in optical sensor 236. The duration of the short light pulse should not exceed one quarter of the period of the ultrasonic acoustic wave.

After the still image is formed, transducer 340 and light source 210 remain deactivated for a user selected interval of time $\Delta t3$. Typically, in the time interval $\Delta t3$, ultrasonic acoustic wave 445 propagates out of the observation volume of medium 222 and is absorbed by a material 421 such as rubber or paraffin which is in immersion tank 220. After time interval $\Delta t3$, transducer 340 is activated again for a time interval $\Delta t1$ as shown in FIG. 4A and another ultrasonic acoustic wave 445 is imaged after a delay time $\Delta t2$ as shown in FIG. 4B. The progression shown in FIGS. 4A and 4B is repeated, each time imaging an ultrasonic acoustic wave at the same point in traversing immersion tank 220. The pulsed mode uses a stroboscopic effect to provide a stop action image of an ultrasonic acoustic wave at a specific point in time of evolution of the ultrasonic acoustic wave. Time interval $\Delta t1$ and delay time $\Delta t2$ can be adjusted to respectively control the length of the observed region of ultrasonic acoustic wave 445 and the time in the evolution observed.

The stop action image can be used to determine the energy in ultrasonic acoustic wave 445. As described above, total acoustic power P of the ultrasonic wave is related to light intensities L as $$P = K * \int L \, dy.$$

Energy E of wave 445 is given by an integral of total acoustic power P over time, $$E = \int P \, dt = K * \int \int L \, dy \, dt,$$

but the extent of the image in FIG. 4A and 4B along the direction of propagation (z-axis) is proportional to time of propagation. Accordingly, energy E is $$E = (K/v) * \int \int L \, dy \, dz,$$

where v is the sound velocity in the medium. For digitized intensities the integrals can be approximated by summations so that the energy E is $$E = ((K/v) * \Delta y * \Delta z) * \Sigma L$$

where $\Delta y$ and $\Delta z$ are dimensions of a region in medium 222 represented by a single light intensity L and $\Sigma L$ is the sum of all the light intensities.

According to another use of pulsed mode, delay time $\Delta t2$ may be increased between light pulses so that each successive image frame of ultrasonic acoustic wave 445 shows ultrasonic acoustic wave 445 further along in evolution. Accordingly, an apparent "slow motion" image of ultrasonic acoustic wave 445 can be displayed. Delay time $\Delta t2$ can also be varied in many other ways to provide other stroboscopic effects.

Figure 5:
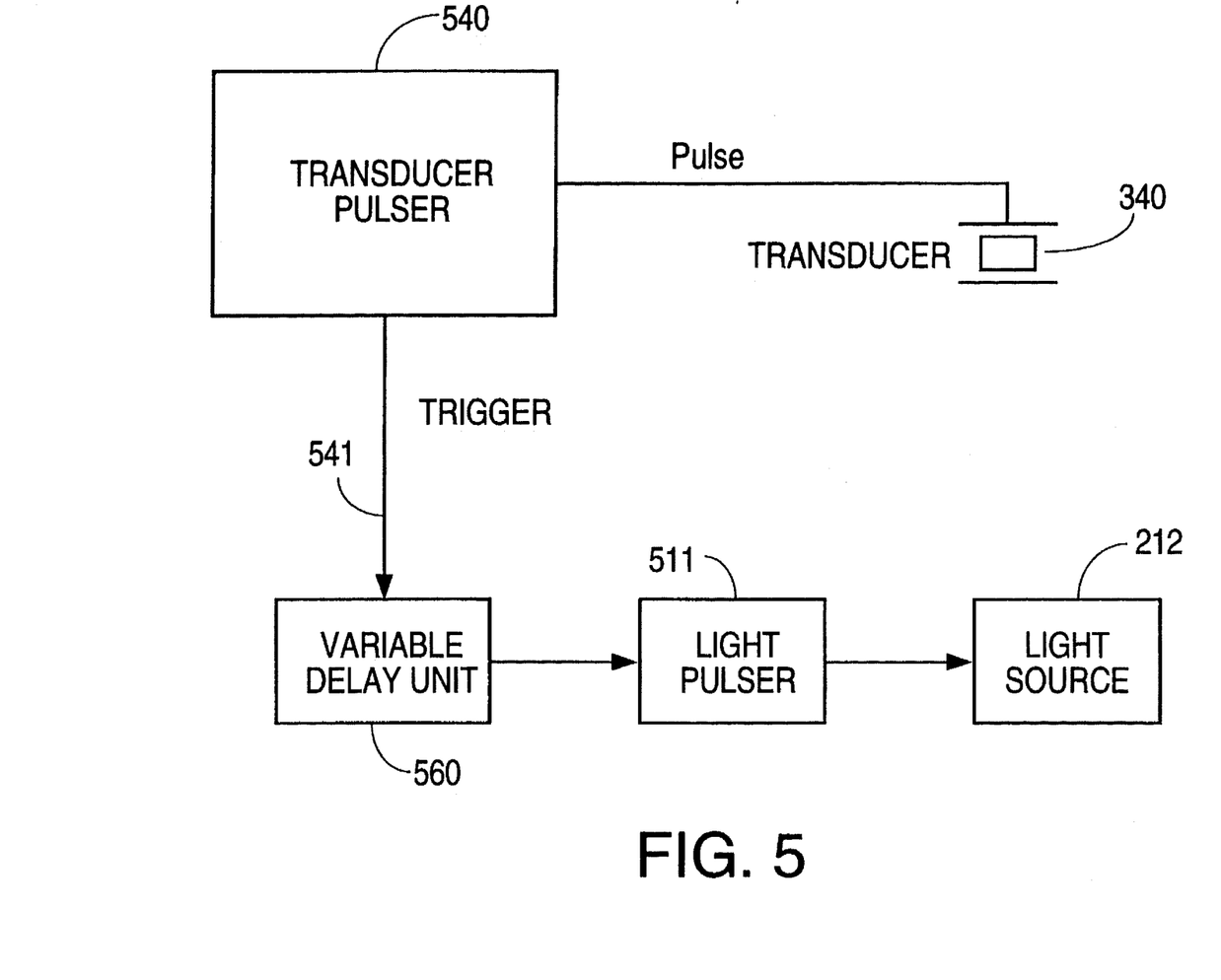
FIG. 5 is a block diagram including a timing circuit for creating stroboscopic schlieren images in accordance with an embodiment of the present invention.

FIG. 5 is a block diagram of a circuit for pulse mode operation of quantitative schlieren system 200. The circuit of FIG. 5 includes a transducer pulser 540 which supplies power pulses to activate transducer 340. The duration and frequency of the power pulses are user controlled, in particular the duration of each power pulse corresponds to the time interval $\Delta t1$, and the frequency corresponds to $1/\Delta t3$. Transducer pulser 540 also asserts a trigger signal which indicates when transducer 340 is activated. Such transducer pulsers are well known in the art and commercially available from Panametrics, Inc. of Waltham, Mass.

A variable delay unit 560 receives the trigger signal from transducer pulser 540 and asserts a delayed trigger signal on line 561. The delayed trigger signal is delayed by delay time $\Delta t2$ after leading edge of the first trigger signal. The user selected delay time $\Delta t2$ can either be constant or can vary in a user selected manner. For example, delay time $\Delta t2$ can be increased between successive light pulses to create a slow motion image of propagation of ultrasonic acoustic wave 445.

A light pulser 511 receives the delayed trigger signal and causes light source 212 to generate a pulse. Typically, light pulser 511 is a pulsed power supply for light source 212. Pulsed power supplies are well known in the art and commonly available for many type of light sources.

The embodiments disclosed have numerous advantages over prior art systems for measuring pressure or power distributions of ultrasonic acoustic waves. First, in accordance with the present invention, determination of a quantitative profile of pressure and/or power is virtually instantaneous and eliminates the prior art measurement times which are sometimes more than an hour to move a probe and measure pressures at a series of points. Second, changes in the ultrasonic acoustic wave caused by a probe in the medium are eliminated because imaging light does not interfere with propagation of ultrasonic acoustic waves. Third, the range of measurable acoustic power is typically greater for a quantitative schlieren imaging system in accordance with the present invention than for prior art systems using probes because in accordance with the present invention, acoustic pressure and power is measurable if the adiabatic piezo-optic coefficient for the medium is defined, which for water is the case right up to the point where acoustic power begins to cause non-linear compression in the water. Typical prior art probes cease to function properly at much lower acoustic pressure levels.

To permit quantitative measurements of acoustic power in medium 222, lenses 216, 231, and 234, point source 211, spatial filter 232, and the sensitivity of optical sensor 236 must be carefully matched, and constructing a quantitative schlieren imaging system requires balancing of several factors.

It is essential that the region where the zero-th order light is focused on spatial filter 232 does not overlap with the region on spatial filter 232 where the first order diffracted light is focused. If the two focus regions overlap, the overlapping portion is either blocked or transmitted by spatial filter 232. If blocked, a portion of the first order light is blocked making prediction of light intensities and quantitative determinations of pressure difficult. If transmitted, a portion of the zero-th order light is imaged, and the signal to noise ratio in the image may become unacceptable. Accordingly, the angular size of the focus regions of the first and zero-th order diffracted light must be less than the angular separation $\Delta\Theta$ between the centers of the zero-th and first order focus regions.

Since the angular separation $\Delta\Theta$ is approximately $\lambda/\Lambda$ radians, increasing light wavelength $\lambda$ increases the angular separation for a given ultrasonic acoustic wavelength $\Lambda$. Infrared lasers are commercially available light sources which provide sufficient power and operate in pulsed mode. Filter 214 can limit light wavelength $\lambda$. Once a light wavelength $\lambda$ is chosen, the longest ultrasonic acoustic wavelength $\Lambda$ of interest controls the minimum angular separation $\Delta\Theta$ between focus regions of diffracted light. For light with wavelength $\lambda$ of about 0.5 μm and ultrasonic waves with wavelength $\Lambda$ of about 0.3 mm, the angular separation $\Delta\Theta$ is about 0.09°.

The effective size of point source 211 (typically the size of the pin hole aperture) controls the minimum angular size of the focus region of the zero-th order light because the focus region is an image of point source 211. For quantitative schlieren imaging system 200, the minimum angular size approximately equals the effective size of point source 211 divided by the focal length of lens 216. The angular separation $\Delta\Theta$ must be greater than the minimum angular size of the focus region. It is therefore desirable to use a small point light source. However, the effective size of point source 211 can not be made too small because reducing the effective size typically reduces the amount of light available for imaging.

Diffraction and aberrations in lenses 216 and 231 and defects in windows 224 and 226 further increase the focus regions on spatial filter 232. Accordingly, the usable apertures (ratios of diameter to focal length) of lens 216 and 231 are limited. If the lenses 216 and 231 are spherical and the apertures are too large, spherical aberration increases the focus region size beyond the angular separation $\Delta\Theta$. Aspherical lenses are typically more expensive than spherical lenses especially at typical diameters required for a quantitative schlieren imaging system for measuring ultrasonic acoustic waves. In any case, the angular size of light cone 215 provided by point source 211 is typically limited, so that if lens 216 has too large an aperture, point source 211 at the focal point of lens 216 does not provide a uniform light cone 215 that extends over the entire area of lens 216. If the apertures of lenses 216 and 231 are too small, diffraction caused by lenses 216 and 231 may increase the focus region size beyond the angular separation $\Delta\Theta$. Use of longer wavelength light increases the problem of diffraction in lenses 216 and 231 and decreases the resolution of quantitative schlieren imaging system 200. An optimal aperture value for both lens 216 and 231 may be determined by performing a software simulation with actual or manufacturable lenses. Several software packages for performing this type of simulation are available, including Oslo from Sinclair Optics, Inc. of Fairport, N.Y.

Typically, the size of lenses 216 and 231 makes lenses 216 and 231 the most expensive optical elements. To reduce the cost of system 200, lenses 216 and 231 should be the components which limit the performance of quantitative schlieren imaging system 200.

Lens 234 must be able to capture several orders of diffracted light from spatial filter 232 and in combination with lens 231 form an image of an observation volume in medium 222. Depending on the focal length of lens 231, a commercially available camera lens sold with or for photographic or video cameras such as optical sensor 236 in FIG. 2 may satisfy the imaging requirements. If necessary, lens 234 can be a compound lens including a camera lens and a corrective lens in front of the camera lens to improve the imaging. Selecting an appropriate lens 234 or corrective lens can be done using well known computer simulation techniques such as implemented by the Oslo software.

Optical sensor 236 should be chosen for sensitivity (minimum light levels that can be sensed), linearity (uniform proportionality between the light level and the signal output across the image area), and signal-to-noise ratio (inherent errors in the signal).

Given the maximum ultrasonic acoustic wavelength to be measured and the highest order of diffracted light to be used in imaging, the components of the quantitative schlieren imaging system can be selected as follows. First, select a pulsed or continuous light source which has a suitable bandwidth (range of light wavelengths). The optical system should be optimized for the entire bandwidth. Second, determine the angular resolution requirement $\Delta\Theta$. Third, perform optical simulations to find an optical system that meets the angular resolution requirement. The optical simulation should account for windows 224 and 226, the properties of lenses 216 and 231 including surface quality, aperture, and chromaticity, and the effect of any mirrors 316 and 331 employed to make the quantitative schlieren imaging system more compact. Fourth, compute the convolution size of point source 211 to determine the maximum effective size of point source 211, and if the maximum size is too small to provide adequate light for imaging the diffracted light, repeat the third step using a smaller angular resolution (more expensive optics). Fifth, design or select a lens 234 based on the desired magnification, resolution, chromaticity, and entrance pupil. Sixth, select an optical sensor based on balancing factors such as sensitivity, linearity, resolution, and dynamic range.

Referring again to FIG. 3, in an exemplary embodiment, point source 211 includes a laser diode which emits light pulses having peak power of 80 watts of light at wavelengths between about 800 and 810 nm over an effective diameter of about 0.2 mm. With this bandwidth, no filter 214 is required, and all of the light is available for imaging. Point source 211 and transducer 340 may be operated in pulse mode when controlled by a timing circuit such as described above. For operation to provide a continuous image of an ultrasonic acoustic wave, pulses from point source 211 are randomized or at least not synchronized with the period of the ultrasonic acoustic wave from transducer 340.

Light from point source 211 is reflected off a 10 cm diameter flat mirror 316 and passes through lens 216. Lens 216 is a spherical glass lens having a diameter of about 80 mm and a focal length of about 800 mm. Optical windows 224 is a 19 mm thick, 75 mm diameter, glass window which is flat up to variations less than about 80 nm. Window 226, lens 231, and mirror 331 are identical to window 224, lens 216, and mirror 316, respectively.

Spatial filter 232 is located 50 cm from mirror 331 so that the total optical length from lens 231 to spatial filter 232 equals the focal length of lens 231. Spatial filter 232 is made of planar glass and has a 0.8 mm diameter opaque central region which blocks transmission of the zero-th order light.

Optical sensor 236 is a video camera model XC77 available from Sony, Inc. Lens 234 is a compound lens having a focal length of 135 mm and an f-stop of f/2.0. Lens 234 is additionally chosen to minimize vignetting and provide a uniform illumination. Such camera lenses are commercially available from Nikon, Inc.

Although the present invention has been described with reference to particular embodiments, the description is only an example of the invention's application and should not be taken as a limitation. In particular, even though much of preceding discussion was aimed at schlieren systems contain focusing lenses, present invention may also be practiced using focusing mirrors. Additionally although specific example of a medium in the above is water, other mediums such as oil, gelatine, or a gases may be employed. Various further modifications, adaptations, substitutions and combinations of different features of the specific embodiments can be practiced without departing from the scope of the invention set forth in the appended claims.

We claim:

1. An apparatus for quantitatively measuring a characteristic of ultrasonic acoustic waves, comprising:
   an immersion tank to contain a medium through which said ultrasonic waves are passed;
   a source of substantially parallel light oriented with respect to said medium so that said substantially parallel light enters said medium along a first axis;
   a spatial filter positioned to block a portion of light that emerges from said medium, wherein said portion of light blocked includes zero-th order diffracted light that emerges from said medium in a direction substantially parallel to said first axis;
   a camera positioned to image said light emerging from said medium that is not blocked by said spatial filter; and
   a quantitative analyzer coupled to said camera wherein said quantitative analyzer generates a quantitative measure of said characteristic of said ultrasonic waves passing through said medium.

2. The apparatus of claim 1, further comprising an optical system positioned between said immersion tank and said spatial filter so as to focus said light emerging from said medium.

3. The apparatus of claim 2, wherein said spatial filter is positioned in a plane where said optical system forms an image of said light emerging from said medium.

4. The apparatus of claim 3, wherein said spatial filter comprises a planar surface having an opaque region wherein said opaque region blocks said portion of said light emerging from said medium after said light emerging from said medium is focused by said optical system.

5. The apparatus of claim 4, wherein said opaque region comprises an opaque circular region.

6. The apparatus of claim 1, further comprising a timing circuit coupled to said source of substantially parallel light, wherein said timing circuit synchronizes pulses of light from said source of substantially parallel light with a user selected delay from activations of a transducer.

7. The apparatus of claim 6, wherein said user selected delay is constant.

8. The apparatus of claim 6, wherein said user selected delay varies in a user selected manner.

9. The apparatus of claim 6, wherein said timing circuit further comprises circuitry for periodically activating said transducer for a user selected time interval.

10. The apparatus of claim 1, wherein said characteristic of said ultrasonic waves is an integral of acoustic pressure along a path through said medium.

11. The apparatus of claim 10, wherein said quantitative analyzer further comprises a look-up table including a plurality of predicted light intensity values and an integrated pressure value for each of said plurality of predicted intensity values.

12. The apparatus of claim 1, wherein said characteristic of said ultrasonic waves is an integral of acoustic intensity along a path through said medium.

13. The apparatus of claim 1, wherein said characteristic of said ultrasonic waves is total acoustic power.

14. The apparatus of claim 1, wherein said characteristic of said ultrasonic waves is acoustic energy in a user selected section of said ultrasonic acoustic waves.

15. A schlieren imaging system, comprising:
   a first optical system which provides light diffracted from pressure changes in a volume of a medium, wherein said pressure changes are caused by propagation of an ultrasonic acoustic wave;
   a spatial filter positioned to receive said light from said first optical system, wherein said spatial filter blocks zero-th order diffracted light from said first optical system;
   a second optical system positioned to receive unblocked light from said spatial filter, wherein said second optical system forms an image using said unblocked light;
   an optical sensor positioned to receive said image, wherein said second optical system generates an array of light intensity values, each light intensity value indicating a light intensity for a region of said image; and
   a quantitative analyzer coupled to received said array of light intensity values from said optical sensor, wherein said quantitative analyzer generates from said array of light intensity values an array of characteristic values which quantify a characteristic of said ultrasonic acoustic wave.

16. The schlieren imaging system of claim 15, wherein each characteristic value indicates an integral of acoustic pressure changes along a path through said volume of said medium.

17. The schlieren imaging system of claim 15, wherein each characteristic value indicates an integral of acoustic intensity along a path through said volume of said medium.

18. An apparatus for quantitatively measuring a characteristic of ultrasonic acoustic waves, comprising:

a collimating lens;

an approximate point light source located at a focal point of said collimating lens;

a tank which contains a medium through which said ultrasonic acoustic waves are passed, said tank including a first optical window and a second optical window, said first and said second optical windows being located on opposite walls of said tank so that light traversing said tank along a first axis enters through said first optical window and exits through said second optical window, said tank being positioned so that light emerging from said collimating lens along an optical axis of said collimating lens enter said first optical window along said first axis;

a converging lens positioned so that light emerging from said tank along said first axis enters said converging lens along an optical axis of said converging lens;

a spatial filter positioned to block light that enters said converging lens parallel to said optical axis of said converging lens;

an imaging lens positioned to form an image of a volume in said tank; and a quantitative analyzer which converts said image into a quantitative measure of said characteristic of said ultrasonic waves passing through said medium.

19. The apparatus of claim 18, wherein said point source of light emits light has a bandwidth less than 200 nm.

20. The apparatus of claim 18, wherein said point source of light further comprises an optical filter which limits a bandwidth of light emitted by said point source of light.

21. The apparatus of claim 18, wherein said point source of light comprises a laser diode.

22. The apparatus of claim 18, wherein said first and said second optical windows have surfaces which variations that are no larger than $\lambda/10$ where $\lambda$ is the average wavelength of light emitted from said point source of light.

23. The apparatus of claim 22, wherein said point source of light emits light having a bandwidth less than 200 nm.

24. The apparatus of claim 18, further comprising:

a transducer pulser;

a variable delay circuit coupled to the transducer pulser; and a light pulser coupled to the variable delay circuit and to the point light source.

25. The apparatus of claim 18, wherein the converging and diverging lenses are identical and have a diameter greater than 5 cm.

26. A method for providing a quantitative image of an ultrasonic acoustic wave, comprising the steps of:

generating a light beam that travels along a first direction through a medium;

generating a first ultrasonic acoustic wave which propagates through said medium;

spatially filtering light exiting from said medium, wherein said spatial filtering blocks light that exits said medium along said first direction and transmits light diffracted by a pressure change caused in said medium by said first ultrasonic acoustic wave, wherein said light transmitted is at one or more non-zero angles relative to said first direction;

forming a first image of said medium from said light transmitted during spatial filtering;

measuring a first light intensity value for a region in said first image; and generating from said first light intensity value a quantitative value characteristic of a property of said ultrasonic acoustic wave.

27. The method of claim 26, further comprising the steps of:

generating a second ultrasonic acoustic wave which propagates through said medium, wherein said second ultrasonic acoustic wave has a known power distribution;

forming a second image of said medium using light diffracted by pressure change caused in said medium by said second ultrasonic acoustic wave;

measuring a second light intensity value for a region in said second image; and determining a constant which relates said second light intensity value to a predicted light intensity value which was predicted based on said known power distribution of said second ultrasonic acoustic wave.

28. The method of claim 27, wherein the step of generating a value characteristic of a property of said ultrasonic acoustic wave further comprises the steps of:

providing a look-up table which relates each of a plurality of pressure values to a correspond predicted light intensity values;

normalizing said first light intensity value according to said constant;

matching said normalized first light intensity value with a predicted light intensity value in said look-up table; and identifying a pressure value in said look-up table which corresponds to the predicted light intensity value matched with said normalized first intensity value.

29. The method of claim 26, further comprising the steps of:

generating a second ultrasonic acoustic wave which propagates through said medium, wherein said second ultrasonic acoustic wave has a known power;

forming a second image of said medium using light diffracted by pressure change caused by said second ultrasonic acoustic wave;

measuring a set of light intensity values for a region extending across said second image; and determining a constant which relates a sum of said set of light intensity values to said known power of said second ultrasonic acoustic wave.

30. The method of claim 29, wherein the step of generating a value characteristic of a property of said ultrasonic acoustic wave further comprises the step of generating an acoustic intensity value indicating an integral of acoustic intensity along a path through said ultrasonic acoustic wave, wherein said intensity value equals the product of said first light intensity value by said constant.

* * * * *